United States Patent
Liang et al.

(10) Patent No.: US 11,988,952 B2
(45) Date of Patent: May 21, 2024

(54) LENS DRIVING DEVICES AND DRIVING METHODS THEREOF

(71) Applicants: Sintai Optical (Shenzhen) Co., Ltd., ShenZhen (CN); Asia Optical Co., Inc., Taichung (TW)

(72) Inventors: Hui-Yuan Liang, Taichung (TW); Chien-Heng Yu, Taichung (TW); Zi-Ying Ye, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 264 days.

(21) Appl. No.: 17/743,901

(22) Filed: May 13, 2022

(65) Prior Publication Data
US 2022/0390812 A1 Dec. 8, 2022

(30) Foreign Application Priority Data
May 26, 2021 (TW) .................. 110119068

(51) Int. Cl.
*G03B 5/02* (2021.01)
*H02K 41/035* (2006.01)

(52) U.S. Cl.
CPC .......... *G03B 5/02* (2013.01); *H02K 41/0354* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 11,163,133 B2 * | 11/2021 | Shin | H02K 41/031 |
| 11,624,968 B2 * | 4/2023 | Hu | G02B 7/08 |
| | | | 396/55 |
| 2018/0367714 A1 * | 12/2018 | Im | H04N 23/687 |
| 2020/0153315 A1 * | 5/2020 | Grosskreuz | B65G 54/02 |
| 2021/0026098 A1 | 1/2021 | Jang | |
| 2021/0041658 A1 * | 2/2021 | Jang | G03B 30/00 |
| 2021/0055628 A1 | 2/2021 | Shin et al. | |
| 2021/0173226 A1 * | 6/2021 | Lee | G03B 30/00 |

FOREIGN PATENT DOCUMENTS

| | | |
|---|---|---|
| TW | 200700877 A | 1/2007 |
| TW | 201600898 A | 1/2016 |
| TW | 202020543 A | 6/2020 |

\* cited by examiner

*Primary Examiner* — Clayton E. LaBalle
*Assistant Examiner* — Diana Hancock
(74) *Attorney, Agent, or Firm* — McClure, Qualey & Rodack, LLP

(57) ABSTRACT

A lens driving device and a driving method thereof are provided. The lens driving device includes a lens frame, a magnetic group, a driving element group and a control device. The lens frame carries at least one optical element. The magnetic group includes a plurality of pairs of magnetic elements. The driving element group includes at least two coils. The control device supplies power to the driving element group so that the lens frame is driven by the driving element group to move. The driving element group is disposed on the lens frame, and the amount of the lens frame is equal to that of the driving element group. The control device in a first driving state supplies the power to the coils in sequence so that the driving element group is moved from a pair of magnetic elements to another pair of magnetic elements.

20 Claims, 7 Drawing Sheets

LENS DRIVING DEVICES AND DRIVING METHODS THEREOF

BACKGROUND OF THE INVENTION

Field of the Invention

The invention relates to a lens driving device and the driving method thereof, and more particularly to a motor and its driving method capable of providing a long travel range and maintaining the accuracy.

Description of the Related Art

A voice coil motor (VCM) is a motor in which coils are disposed in a permanent magnetic field and the stretch of a spring piece is controlled by changing a direct electric current passing through the coils, thereby providing an upwards/downwards movement. A VCM has merits of high frequency response and high accuracy, and is therefore widely used in a camera of a cell phone. In operation, the position of a lens can be adjusted by a VCM to perform auto focusing operation for forming a clear image.

Generally, the coils of a VCM can perform a positioning control only in the range of magnetic poles. The movable elements, for example the coils and the position sensors, are moved in accordance with the magnitude of a voltage applied to the coils. The range of the magnetic pole is generally within 1 mm. If a long travel range is required, then the magnet has to be enlarged to increase the range of the magnetic pole. However, the driving integrated circuit (IC) for a known VCM is a closed loop circuit. The resolution of the analog-to-digital (A/D) converter for position feedback is fixed, for example 12 bits. If the magnet is enlarged ten times so that the travel range is increased from 1 mm to 10 mm, then the resolution will be reduced to one tenth of the original value.

BRIEF SUMMARY OF THE INVENTION

The invention therefor provides a lens driving device and the driving method thereof to address the described issue. The lens driving device in accordance with an exemplary embodiment of the invention includes at least one lens frame, a magnetic group, at least one driving element group, and a control device. The lens frame carries at least one optical element. The magnetic group includes a plurality of pairs of magnetic elements. The driving element group includes at least two coils. The control device supplies power to the at least one driving element group so that the at least one lens frame is driven by the at least one driving element group to move. The at least one driving element group is disposed on the at least one lens frame, and the amount of the at least one lens frame is equal to that of the at least one driving element group. The control device in a first driving state supplies the power to the at least two coils of the at least one driving element group in sequence so that the at least one driving element group is moved from a pair of magnetic elements to another pair of magnetic elements. The control device in a second driving state supplies the power to the at least one driving element group so that the at least one driving element group is moved, without beyond the another pair of magnetic elements, from a first position to a predetermined position.

In another exemplary embodiment, the control device in the second driving state supplies the power to the at least two coils of the at least one driving element group in a closed loop way so that the at least one driving element group is moved, without beyond the another pair of magnetic elements, from the first position to the predetermined position.

In yet another exemplary embodiment, the at least one driving element group further includes at least one position sensor, the control device in a closed loop way.

In another exemplary embodiment, the control device obtains position information of the corresponding at least one driving element group from the at least one position sensor and adjusts a position of the at least one driving element group by using the position information.

In yet another exemplary embodiment, the control device in a first driving state supplies the power to the at least two coils of the at least one driving element group in an open loop way so that the at least one driving element group is moved from the pair of magnetic elements to the another pair of magnetic elements.

In another exemplary embodiment, the at least one driving element group further includes two position sensors, each of which corresponds to one of the at least two coils, wherein the control device determines whether a specific one of the position sensors is not beyond the another pair of magnetic elements, and a loop for the coil corresponding to the specific one of the position sensors is turned into closed and a voltage is supplied to the coil corresponding to the specific one of the position sensors so as to move the at least one driving element group when the specific one of the position sensors is not beyond the another pair of magnetic elements.

In yet another exemplary embodiment, the control device in a closed loop way obtains position information of the corresponding at least one driving element group from the specific one of the position sensors and adjusts a position of the at least one driving element group by using the position information.

In another exemplary embodiment, the coils of the at least one driving element group are spaced a predetermined distance, and the predetermined distance is (1×n)±0.25 times a width of the pair of magnetic elements, where n is a natural number.

In yet another exemplary embodiment, when magnetic field lines of the pair of magnetic elements have a phase angle of 360°, each of the coils and the magnetic group have a phase difference 360°±90° therebetween.

In another exemplary embodiment, the lens driving device satisfies a condition of $$1300 \text{ mm}^2 < \frac{LL}{Dmin} \times MW \times MH < 4291 \text{ mm}^2$$

where LL is a length in mm of a lens device measured from an object side surface of a lens closest to the object side to an image side surface of another lens closest to the image side, Dmin is a minimum of a range in mm of driving the coils, MW is a width in mm of each magnetic element, and MH is a height in mm of each magnetic element.

In yet another exemplary embodiment, the lens driving device satisfies a condition of $$0.04 < \frac{\sqrt{CD \times MD}}{LL} < 3.7$$

where CD is a distance in mm between the coils, MD is a distance in mm between centers of two adjacent magnetic elements, and LL is a length in mm of a lens device measured from an object side surface of a lens closest to the object side to an image side surface of another lens closest to the image side.

In another exemplary embodiment, the lens driving device satisfies a condition of $-3.7<(N\times MV-Dmax)+I<40$ where N is the amount of the magnetic elements, MV is a volume in mm³ of each magnetic element, Dmax is a maximum of a range in mm of driving the coils, and I is an electric current in A passing through the coils.

In yet another exemplary embodiment, the lens driving device satisfies a condition of $$15\, A\cdot\Omega\cdot\sqrt{mm} < \frac{LL}{Dmin}\times I\times R\times\sqrt{\frac{CD\times MD}{LL}} < 3957\, A\cdot\Omega\cdot\sqrt{mm}$$

where LL is a length in mm of a lens device measured from an object side surface of a lens closest to the object side to an image side surface of another lens closest to the image side, Dmin is a minimum of a range in mm of driving the coils, I is an electric current in A passing through the coils, R is an electric resistance in Ω of the coils, CD is a distance in mm between the coils, and MD is a distance in mm between centers of two adjacent magnetic elements.

In another exemplary embodiment, the lens driving device satisfies a condition of $$0.97\frac{1}{\sqrt{mm}} \le \frac{LL}{MV} \le 2.76\frac{1}{\sqrt{mm}}$$

where LL is a length in mm of a lens device measured from an object side surface of a lens closest to the object side to an image side surface of another lens closest to the image side, and MV is a volume in mm³ of each magnetic element.

In yet another exemplary embodiment, the lens driving device satisfies a condition of MH<LH where MH is a height in mm of each magnetic element, and LH is a height in mm of a lens device.

The method of driving an optical element of a lens device to move, in accordance with an exemplary embodiment of the invention, includes providing a lens driving device which includes at least one lens frame, a magnetic group, at least one driving element group and a control device; supplying power to the at least one driving element group in sequence in an open loop way for controlling the at least one driving element group to move the at least one lens frame from a pair of magnetic elements to another pair of magnetic elements; determining whether the at least one driving element group corresponding to the another pair of magnetic elements is in a specific position; and when the at least one driving element group corresponding to the another pair of magnetic elements is not in the specific position, supplying the power to the at least one driving element group in a closed loop way for controlling the at least one driving element group corresponding to the another pair of magnetic elements to move from a first position to the specific position.

In another exemplary embodiment, the at least one driving element group further includes at least one position sensor. The method further includes, in the closed loop way, sensing a position of the at least one driving element group by the at least one position sensor to obtain position information; and adjusting the position of the at least one driving element group by using the position information.

In yet another exemplary embodiment, the at least one driving element group further includes two coils and two position sensors, and each of the position sensors corresponds to one of the coils. The method further includes determining whether a specific one of the position sensors is not beyond the another pair of magnetic elements; turning a loop for the coil corresponding to the specific one of the position sensors into closed when the specific one of the position sensors is not beyond the another pair of magnetic elements; driving the coil to move the at least one driving element group; in the closed loop way, sensing a position of the at least one driving element group by the position sensors to obtain position information; adjusting the position of the at least one driving element group by using the position information.

In another exemplary embodiment, the coils of the at least one driving element group are spaced a predetermined distance, and the predetermined distance is $(1\times n)\pm 0.25$ times a width of the pair of magnetic elements, where n is a natural number. When magnetic field lines of the pair of magnetic elements have a phase angle of 360°, each of the coils and the magnetic group have a phase difference 360°±90° therebetween.

In yet another exemplary embodiment, the lens driving device satisfies at least one of following conditions $$1300\ mm^2 < \frac{LL}{Dmin}\times MW\times MH < 4291\ mm^2,$$

$$0.04 < \frac{\sqrt{CD\times MD}}{LL} < 3.7,\ -3.7 < (N\times MV - Dmax) + I < 40,$$

$$15\, A\cdot\Omega\cdot\sqrt{mm} < \frac{LL}{Dmin}\times I\times R\times\sqrt{\frac{CD\times MD}{LL}} < 3957\, A\cdot\Omega\cdot\sqrt{mm},$$

$$0.97\frac{1}{\sqrt{mm}} \le \frac{LL}{MV} \le 2.76\frac{1}{\sqrt{mm}},\ MH < LH,$$

where LL is a length in mm of the lens device measured from an object side surface of a lens closest to the object side to an image side surface of another lens closest to the image side, Dmin is a minimum of a range in mm of driving coils, MW is a width in mm of each magnetic element, MH is a height in mm of each magnetic element, CD is a distance in mm between the coils, MD is a distance in mm between centers of two adjacent magnetic elements, N is the amount of the magnetic elements, MV is a volume in mm³ of each magnetic element, Dmax is a maximum of a range in mm of driving the coils, I is an electric current in A passing through the coils, R is an electric resistance in Ω of the coils, and LH is a height in mm of the lens device.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
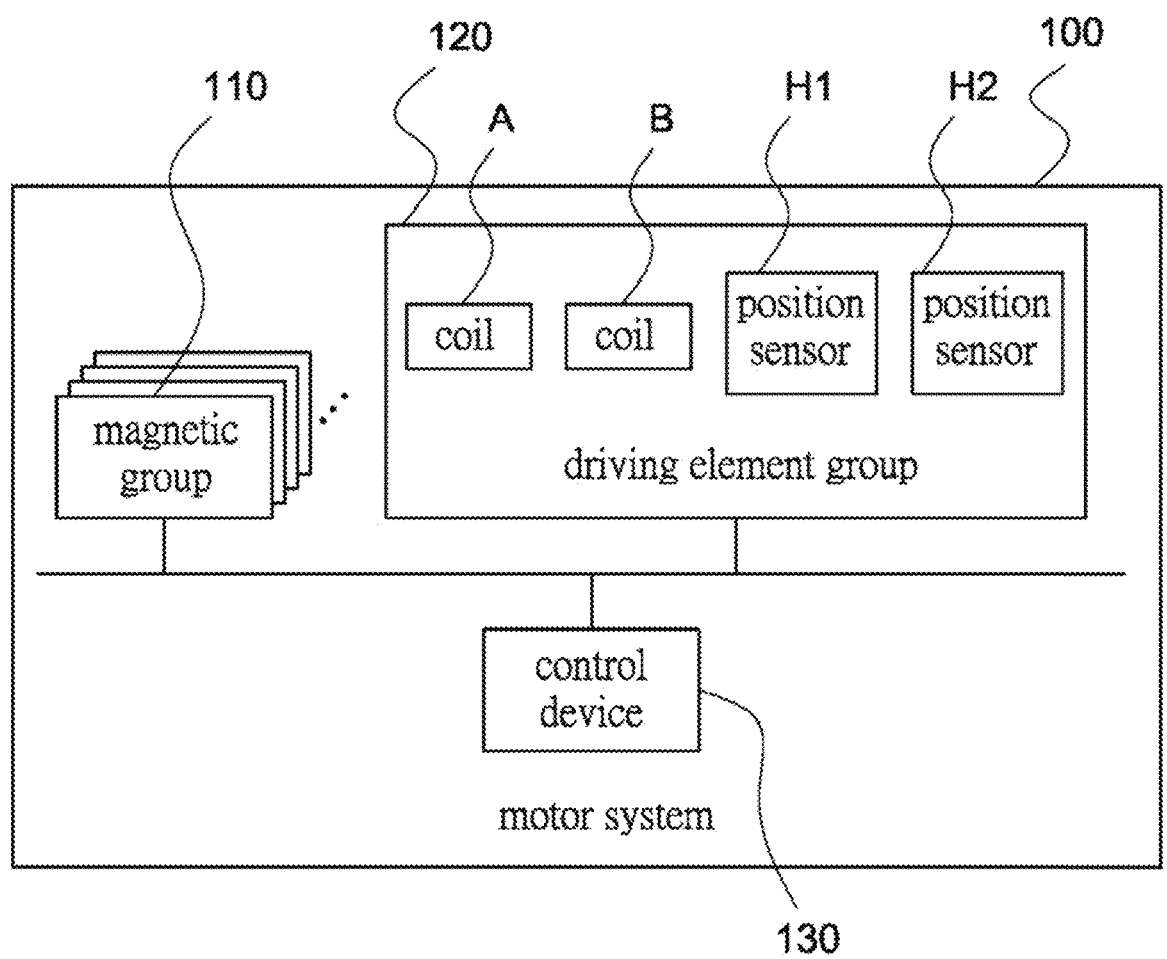
FIG. 1 is a schematic diagram showing a motor system in accordance with an embodiment of the invention.

FIG. 1 depicts a motor system in accordance with an embodiment of the invention. The motor system 100 at least includes a magnetic group 110, a driving element group 120 and a control device 130. In some embodiments, the control device 130 is disposed outside a motor (not shown), while the magnetic group 110 and the driving element group 120 are enveloped by a structure to be disposed in the motor. The magnetic group 110 includes a plurality of pairs of magnetic elements, which are arranged in order in the motor. Each pair of magnetic elements includes a N-pole permanent magnetic object and a S-pole permanent magnetic object. The driving element group 120 at least includes two coils A, B and one or more position sensors H1, H2. It is worth noting that the position sensors H1, H2 in some embodiments may be Hall-effect sensors or magnetoresistance MR sensors, able to change the output voltage thereof in accordance with the magnetic field. The position sensors H1, H2 are configured to detect the position, velocity and/or electric current. The control device 130 may be a processing unit or a driving chip, for controlling the operations of the hardware and software in the motor system 100 and performing the driving method for the motor/lens driving device of the invention. The detail will be described later.

Figure 2:
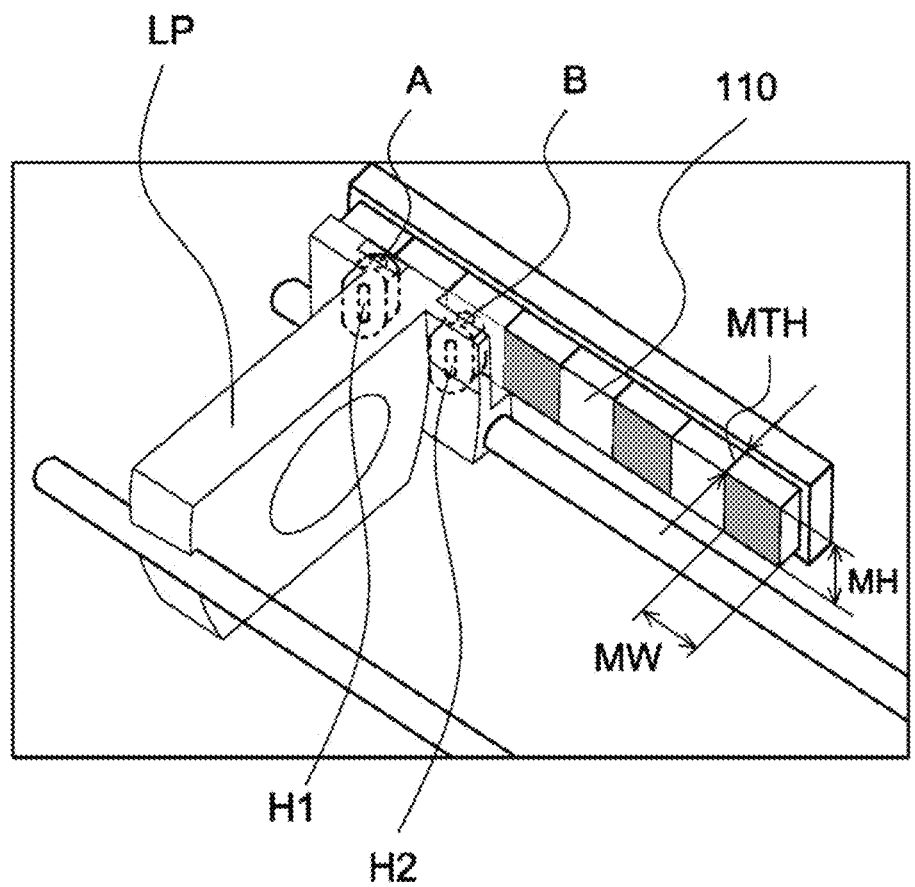
FIG. 2 is a schematic diagram showing the lens driving device in accordance with an embodiment of the invention.
Figure 3:
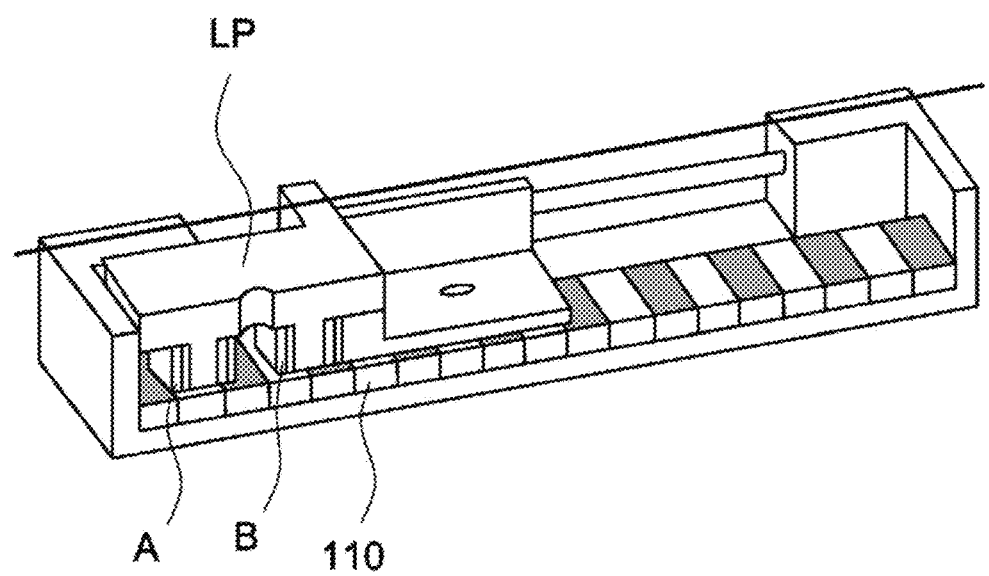
FIG. 3 is a schematic diagram showing an example of the arrangement of coils in accordance with an embodiment of the invention.

FIG. 2 depicts the lens driving device in accordance with an embodiment of the invention, wherein the lens driving device includes the motor system 100 and at least one lens frame LP. As shown, each position sensor is disposed corresponding to one coil. For example, the position sensor H1 is disposed at the center of the coil A, the position sensor H2 is disposed at the center of the coil B, and the coils A, B are disposed next to the magnetic group 110 which has the magnetic elements arranged in order. In this embodiment, the lens frame LP is configured to carry an optical element(s), e.g. at least one lens, the lens device of a camera and others. One lens frame LP is connected to at least two coils. However, only two coils are taken as an example for description. In practice, the coils may be arranged as shown in FIG. 3. In FIGS. 2 and 3, each coils A, B of the driving element group 120 are spaced a predetermined distance. The predetermined distance is (1×n)±0.25 times the width of a pair of magnetic elements, where n is the natural number (i.e. n=1, 2, 3 . . . ). In some embodiments, the predetermined distance is 1.25 times the width of a pair of magnetic elements. In some embodiments, when the magnetic field lines of a pair of magnetic elements have a phase angle of 360°, the coils A, B and the magnetic group 110 have a phase difference 360°±90° therebetween.

Figure 4:
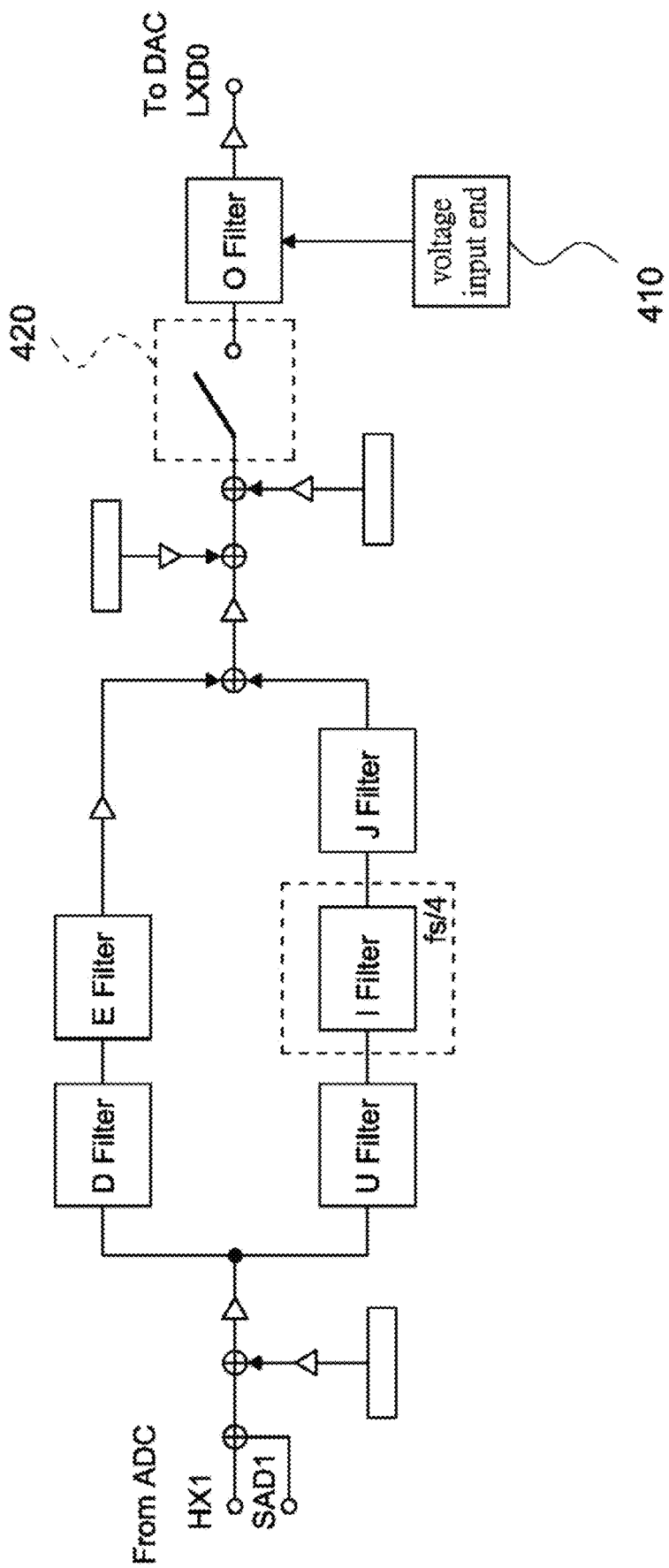
FIG. 4 is a schematic diagram showing an example of a control loop of the coils in accordance with an embodiment of the invention.

FIG. 4 depicts a control circuit of the coil in accordance with an embodiment of the invention. As shown, a voltage can be provided for the coil through a voltage input end 410 to drive the driving element group 120. Further, a switch 420 is able to turn the control circuit of the coil into an open loop or a closed loop, thereby placing the coil under an open loop control or a closed loop control. In some embodiments, the movement without beyond a pair of magnetic elements is under a closed loop control, while the movement across a pair of magnetic elements is under an open loop control. The detail will be described later.

Figure 5:
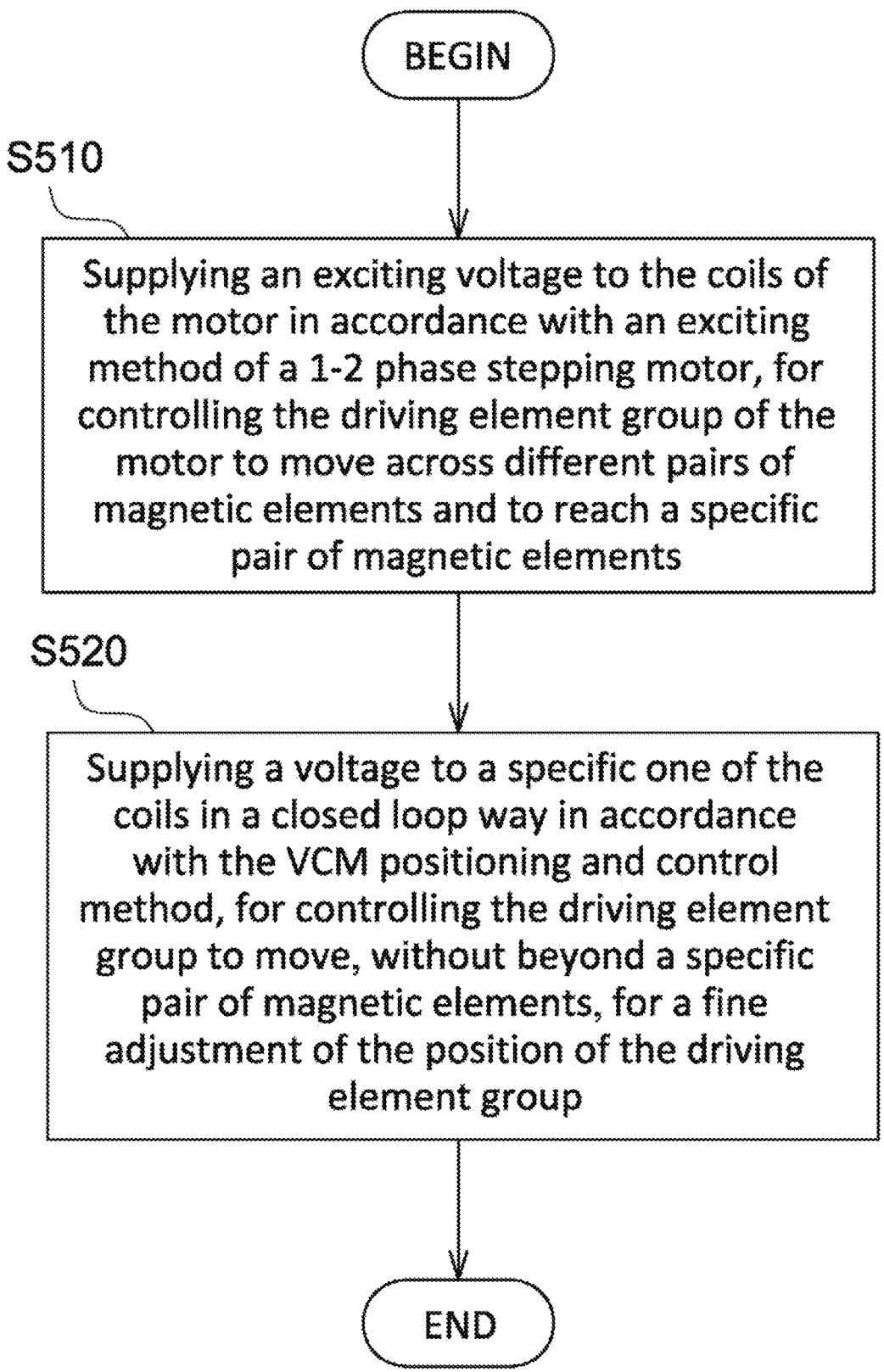
FIG. 5 is a flowchart showing the driving method of a motor in accordance with an embodiment of the invention.
Figures 6A, 6B, 6C, 6D, 6E, 6F, 6G, 6H:
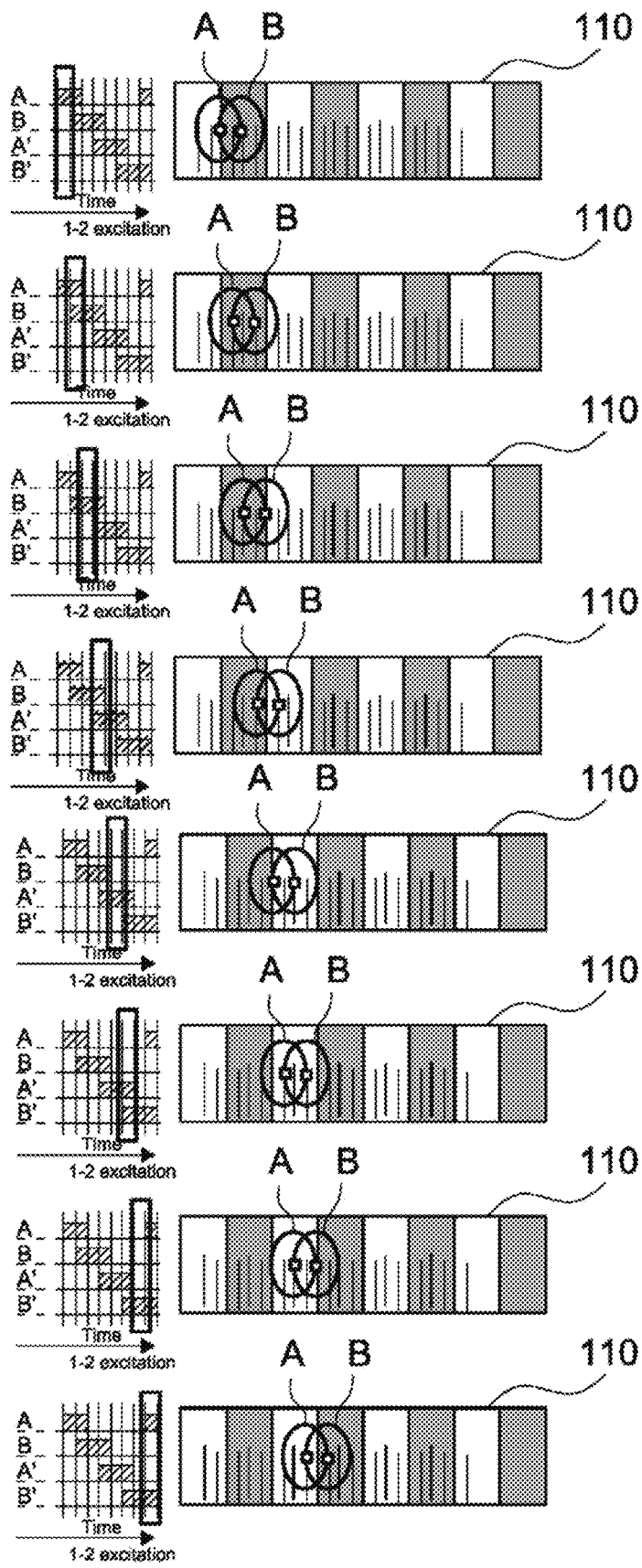
FIGS. 6A-6H are schematic diagrams showing the movement of coils between the magnetic elements in accordance with an embodiment of the invention.

FIG. 5 shows a driving method for the motor in accordance with an embodiment of the invention that is applicable to the motor system of FIG. 1. The motor may include a magnetic group and a driving element group, wherein the magnetic group includes a plurality of pairs of magnetic elements, and the driving element group includes at least two coils. The coils and the magnetic group have a phase difference of a predetermined degrees therebetween. In a first driving state, an exciting voltage is supplied to the coils of the motor in accordance with an exciting method of a 1-2 phase stepping motor, for controlling the driving element group of the motor to move across different pairs of magnetic elements and reach a specific pair of magnetic elements (Step 510). In the exciting method of a 1-2 phase stepping motor, the first phase coil and the second phase coil are alternately excited, and the rotational angle corresponding to each added digital pulse is a half of the original stepping angle. Therefore, the angular resolution can be doubled. FIGS. 6A-6H depict movement of the coils between the pairs of magnetic elements in accordance with an embodiment of the invention. The sequence of excitation of the coils is shown on the left side of the figures. As shown, the sequence of excitation of the coils is A→AB→B-→BA→A→AB→B→BA→A→AB . . . so that the driving element group can be moved rightwards, wherein A and A' represent the same coil, B and B' represent the same coil, the white magnetic elements have the S poles placed upwards and the N poles placed downwards, and the gray magnetic elements, placed reversely, have the N poles placed upwards and the S poles placed downwards. The terms "upwards" and "downwards" are defined along an axis passing through the coils and the magnetic elements. "Upwards" means that the magnetic elements are placed towards the coils, and "downwards" means that the magnetic elements are placed away from the coils. In operation, power is provided for the coil A. On the left side of the figures, the symbol A means a high voltage is provided, the symbol A' means a low voltage is provided, and the electric current passing through the coil A is a clockwise electric current. The center of the coil can be identified in FIG. 6A. Then, power is provided for the coils A and B, wherein the symbol A means a high voltage is provided, the symbol A' means a low voltage is provided, the symbol B means a high voltage is provided, the symbol B' means a low voltage is provided, and the electric currents passing through the coils A and B are clockwise electric currents so that the centers of the coils A and B are moved rightwards as shown in FIG. 6B. Then, power is cut from the coil A but is still provided for the coil B, and the electric current passing through the coil B is a clockwise electric current so that the centers of the coils A and B are moved rightwards as shown in FIG. 6C. Then, power is provided for the coils A and B, wherein the symbol A means a low voltage is provided, the symbol A' means a high voltage is provided, the symbol B means a high voltage is provided, the symbol B' means a low voltage is provided, the electric current passing through the coil A is a counter-clockwise electric current, and the electric current passing through the coil B is a clockwise electric current so that the centers of the coils A and B are moved rightwards as shown in FIG. 6D. Then, power is provided for the coil A but is cut from the coil B, wherein the symbol A means a low voltage is provided, the symbol A' means a high voltage is provided, and the electric current passing through the coil A is a counterclockwise electric current so that the centers of the coils A and B are moved rightwards as shown in FIG. 6E. Then, power is provided for the coils A and B, wherein the symbol A means a low voltage is provided, the symbol A' means a high voltage is provided, the symbol B means a low voltage is provided, the symbol B' means a high voltage is provided, and the electric currents passing through the coils A and B are counterclockwise electric currents so that the centers of the coils A and B are moved rightwards as shown in FIG. 6F. Then, the power is cut from the coil A but is still provided for the coil B, wherein the symbol B means a low voltage is provided, the symbol B' means a high voltage is provided, and the electric current passing through the coil B is a counterclockwise electric current so that the centers of the coils A and B are moved rightwards as shown in FIG. 6G. Then, power is provided for the coils A and B, wherein the symbol A means a high voltage is provided, the symbol A' means a low voltage is provided, the symbol B means a low voltage is provided, the symbol B' means a high voltage is provided, the electric current passing through the coil A is a clockwise electric current, and the electric current passing through the coil B is a counterclockwise electric currents so that the centers of the coils A and B are moved rightwards as shown in FIG. 6H, whereby a movement across a pair of magnetic elements is completed. The direction of the electric current can be adjusted in accordance with the requirements. For example, if the white magnetic elements have the N poles placed upwards and the gray magnetic elements have the S poles placed upwards, then the direction of the electric current will be changed to maintain the direction of the force toward the right (it can be identified by the left-hand rule). Further, by supplying power to the driving element group in accordance with the required step number corresponding to the movement distance, the control device can control the lens frame to move a long distance. For example, in FIGS. 6A-6H, eight steps are required for the driving element group to move from a pair of magnetic elements to another pair of magnetic element. That is, 8×N steps are necessarily inputted when the driving element group needs to move across N pairs of magnetic elements. Further, the positions of the coils can be redefined in accordance with the requirements, not limited to the centers of the coils.

In some embodiments, the control loop of the coils may change to be open, for example, by turning on the switch 420 of FIG. 4, wherein a voltage is provided for the coils in accordance with the exciting method of a 1-2 phase stepping motor so that the driving element group can move across a pair of magnetic elements under an open loop control. Thus, the driving element group can be moved to a specific pair of magnetic elements. In some embodiments, after moving across plural pairs of magnetic elements (magnetic poles), the driving element group can stop at the junction of the N pole and the S pole of the magnetic group where the magnetic field lines are linear. If the driving element group is moved to a specific pair of magnetic elements, then, in a second driving state, a voltage is supplied to a specific one of the coils in a closed loop way in accordance with the VCM (voice coil motor) positioning and control method, for controlling the driving element group of the motor to move without beyond a specific pair of magnetic elements from a first position to a desired position (Step 520). In some embodiments, the driving element group includes at least one position sensor. When the control circuit of the coils is a closed loop, the position sensor can be used to detect the position of the corresponding driving element group for fine adjustment of the position of the driving element group. For example, the magnetic field strength is sensed by the position sensor and the signal thereof is amplified by an operational amplifier (OP) to generate a corresponding voltage. For example, when the position of the position sensor corresponds to the center of the N pole of a magnetic element, the induced voltage approaches the control voltage. For example, the control voltage is 3.3V. When the position of the position sensor corresponds to the center of the S pole of a magnetic element, the induced voltage approaches zero. If there is a difference between the induced voltage and the target voltage, then the controller will provide an electric current for the coil to generate push force and reduce the voltage difference until the voltage difference approaches 0V. At this time, the electric current of the coil is minimum but is greater than 0 mA. Under a closed loop control, power is only supplied to one coil and is cut from the other coil that is in an open loop. The control device can find out which coil should be under the closed loop control, which is the one having its center closest to the conjunction of the N pole and the S pole of the adjacent magnetic elements, or is the one having its voltage (the voltage can be sensed by the position sensor) closest to the target voltage. In some embodiments, the target voltage may be ½ of the control voltage. The control voltage may be 1.65V.

Figure 7:
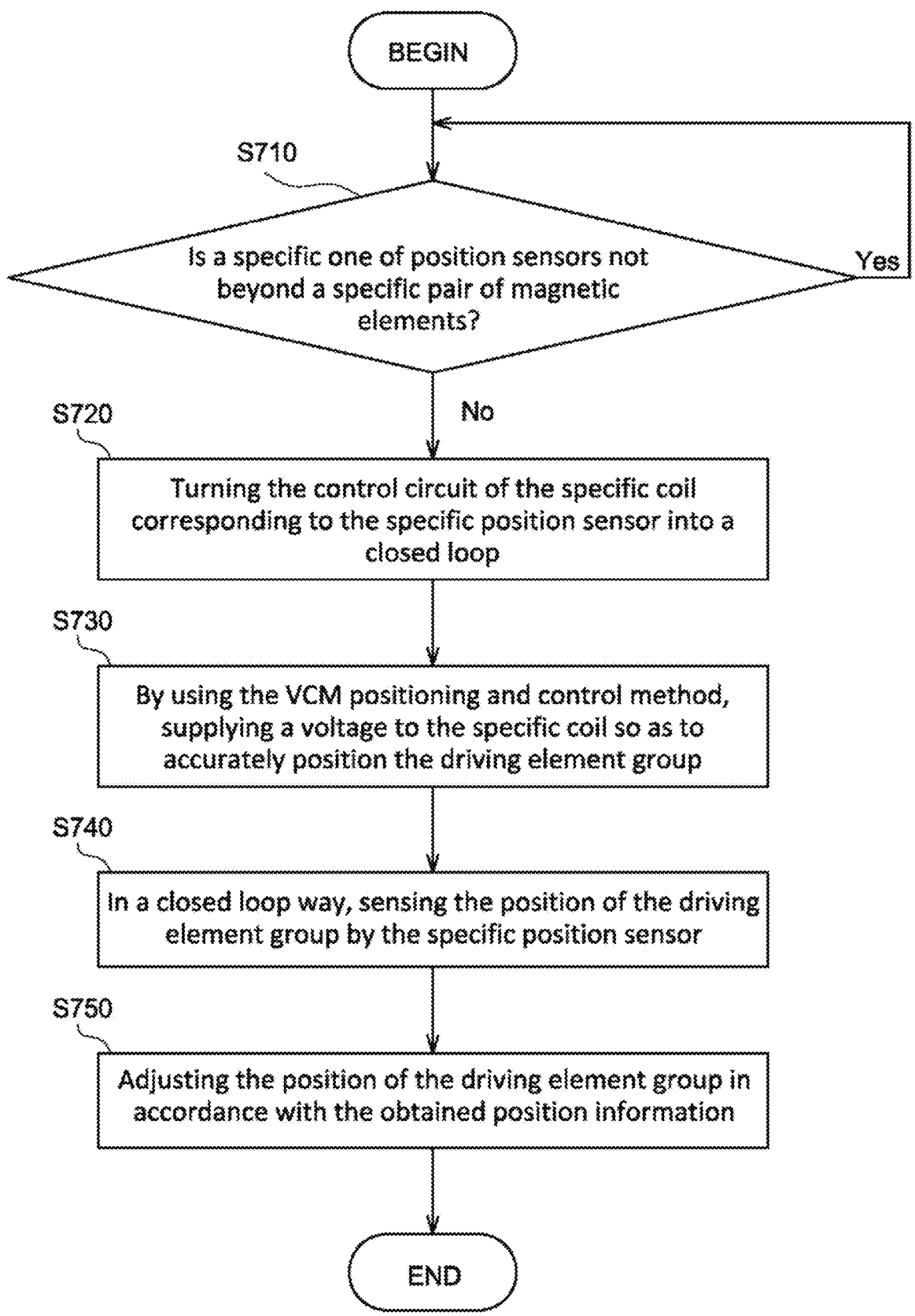
FIG. 7 is a flowchart showing the driving method of a motor in accordance with another embodiment of the invention.

FIG. 7 shows the driving method of a motor in accordance with another embodiment of the invention, wherein the driving element group may include two position sensors, and each position sensor corresponds to one of the two coils. The control method of this embodiment is to judge if the control method of driving motor is necessarily switched. When a voltage is supplied to the coils of the motor, in accordance with an exciting method of a 1-2 phase stepping motor, for controlling the driving element group of the motor to move across a plurality of pairs of magnetic elements of the motor, whether a specific position sensor is not beyond a specific pair of magnetic elements is determined (step S710). When the specific position sensor is beyond the specific pair of magnetic elements (Yes in step S710), the determination in step S710 is continued. When the specific position sensor is not beyond the specific pair of magnetic elements (No in step S710), the control circuit of the specific coil corresponding to the specific position sensor is turned into a closed loop (step S720). Then, a proper driving voltage is generated by the control system in accordance with the difference between the target voltage and the sensed voltage obtained from the position sensor by using the VCM positioning and control method, and is supplied to the specific coil so as to accurately position the driving element group (S730). Then, in a closed loop way, the specific position sensor senses the position of the corresponding driving element group (step S740). The position of the driving element group is adjusted in accordance with the obtained position information (step S750). It is noted that the method of adjusting the driving element group in accordance with the position information has been described above.

Figure 8A:
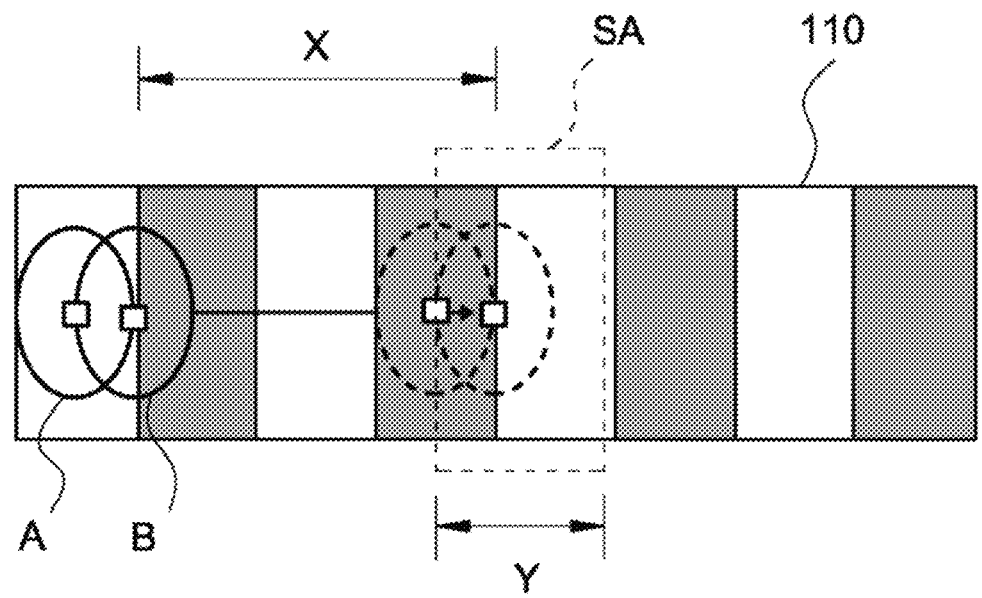
FIGS. 8A and 8B are schematic diagrams showing an example of driving the motor in accordance with an embodiment of the invention.
Figure 8B:
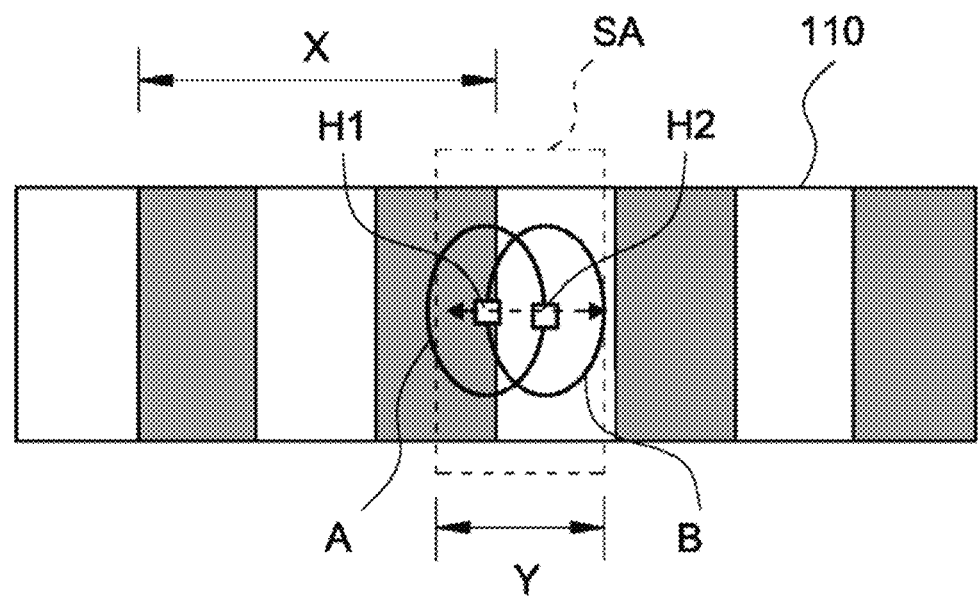

FIGS. 8A and 8B show an example of driving the motor in accordance with the invention, wherein the motor is moved in different travel ranges including, for example, an X travel range (in the first driving state) and a Y travel range (in the second driving state). In the X travel range, a voltage is supplied to the coils A and B of the motor in accordance with an exciting method of a 1-2 phase stepping motor, for controlling the driving element group of the motor to move across plural pairs of magnetic elements of the motor and to reach a specific zone SA corresponding to a specific pair of magnetic elements, as shown in FIG. 8A. When it is sensed that the position sensor for the coil B is in the specific zone SA of the specific pair of magnetic elements, the Y travel range begins. In the Y travel range, the control circuit of the corresponding coil B is turned into a closed loop, and the coil B is driven by using the VCM positioning and control method so that the driving element group can be accurately moved and positioned without beyond the specific pair of magnetic elements, as shown in FIG. 8B. It is worth noting that the position information sensed by the position sensor for the coil B can be used as a feedback signal for a position adjustment.

It is noted that only one lens group is disclosed in the above embodiments. However, the invention is not limited thereto. It is understood that the invention is applicable to a lens device that has a plurality of lens groups arranged in accordance with the above embodiments. By the arrangement of the invention, during the operation of zooming, focusing, and optical image stabilization (OIS) of a lens device, the positions of lens groups can be individually adjusted, the position of a single lens can be solely adjusted, and also the position of a single optical element can be solely adjusted. Further, the adjustment can be a long range adjustment or a fine adjustment. By using the lens driving device and the driving method of the invention, a lens driving device is able to move rapidly and accurately, therefore having the merit of a VCM (i.e. the positioning is accurate) but having no drawback thereof (i.e. the travel range is short). The invention is suitable to a driving device provided with a VCM and capable of a long travel range (e.g. >1 mm), for example, a magnetic or optical read/write head in a position fine-adjustment system, a probe displacement control, a laser focusing and other systems.

The driving method of the invention may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

In the invention, the lens driving device satisfies at least one of the following conditions:

$$1300 \text{ mm}^2 < \frac{LL}{Dmin} \times MW \times MH < 4291 \text{ mm}^2 \quad (1)$$

$$0.04 < \frac{\sqrt{CD \times MD}}{LL} < 3.7 \quad (2)$$

$$-3.7 < (N \times MV - Dmax) + I < 40 \quad (3)$$

$$15 \ A \cdot \Omega \cdot \sqrt{\text{mm}} < \frac{LL}{Dmin} \times I \times R \times \sqrt{\frac{CD \times MD}{LL}} < 3957 \ A \cdot \Omega \cdot \sqrt{\text{mm}} \quad (4)$$

$$0.97 \frac{1}{\sqrt{\text{mm}}} \leq \frac{LL}{MV} \leq 2.76 \frac{1}{\sqrt{\text{mm}}} \quad (5)$$

$$MH < LH \quad (6)$$

where LL is the length in mm (millimeter) of the lens device measured from the object side surface of the lens closest to the object side to the image side surface of the lens closest to the image side and 2.68 mm≤LL≤5 mm, LH is the height in mm of the lens device and 4.5 mm≤LH≤6 mm, R is the electric resistance in Ω (Ohm) of the coils and is equal to 10Ω, MW is the width in mm of the magnetic element and 1 mm≤MW≤1.5 mm, MH is the height in mm of the magnetic element and is equal to 5 mm, MTH is the thickness in mm of the magnetic element and 0.5 mm≤MTH≤0.55 mm, MV is the volume in mm³ of the magnetic element and 2.5 mm³≤MV≤4.125 mm³, I is the electric current in A (amp) passing through the coils and 0.1 A≤I≤0.27 A, CD is the distance in mm between the coils and 1 mm≤CD≤13 mm, D is the range in mm of driving the coils and 0.01 mm≤D≤8.5 mm (i.e. Dmin=0.01 mm and Dmax=8.5 mm), N is the amount of the magnetic elements and is greater than or equal to 2 (preferably 2≤N≤10), and MD is the distance in mm between the centers of two adjacent magnetic elements and 1 mm≤MD≤1.1 mm. It is worth noting that the numeral value of (N×MV−Dmax)+I of condition (3) has no unit because it is merely to perform the arithmetic operations on N, MV, Dmax and I which have units differing from each other.

As previously described, the distance between the centers of the two coils is (1×n)±0.25 times the width of a pair of magnetic elements, where n is the natural number (i.e. n=1, 2, 3 . . . ). However, it is not necessary to specify the distance between two coils by means of a pair of magnetic elements. Rather, it can be specified by one magnetic element. Specifically, the distance between the centers of the two coils is (n+0.5)×MW where n=0, 1, 2, 3 . . . (i.e. non-negative integer) and MW is the width of one magnetic element.

The positioning is accurate when condition (1) is satisfied. The positioning is accurate and the driving speed is stable when condition (2) is satisfied. The driving speed is fast and the weight is under control when condition (3) is satisfied. The driving speed is fast, the positioning is accurate and the driving speed is stable when condition (4) is satisfied. The driving speed is fast when condition (5) is satisfied. The height of the lens device can be reduced when condition (6) is satisfied.

In an embodiment, the lens device has a width LW and 4.5 mm≤LW≤6 mm, the coil has a width CW and CW=3.5 mm, the force F generated by the VCM is equal to 9.8 mN.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens driving device, comprising:
   at least one lens frame carrying at least one optical element;
   a magnetic group comprising a plurality of pairs of magnetic elements;
   at least one driving element group comprising at least two coils;
   a control device supplying power to the at least one driving element group so that the at least one lens frame is driven by the at least one driving element group to move;
   wherein the at least one driving element group is disposed on the at least one lens frame, and the amount of the at least one lens frame is equal to that of the at least one driving element group;

wherein the control device in a first driving state supplies the power to the at least two coils of the at least one driving element group in sequence so that the at least one driving element group is moved from a pair of magnetic elements to another pair of magnetic elements;

wherein the control device in a second driving state supplies the power to the at least one driving element group so that the at least one driving element group is moved, without beyond the another pair of magnetic elements, from a first position to a predetermined position.

2. The lens driving device as claimed in claim 1, wherein the control device in the second driving state supplies the power to the at least two coils of the at least one driving element group in a closed loop way so that the at least one driving element group is moved, without beyond the another pair of magnetic elements, from the first position to the predetermined position.

3. The lens driving device as claimed in claim 1, wherein the at least one driving element group further comprises at least one position sensor, the control device in a closed loop way.

4. The lens driving device as claimed in claim 3, wherein the control device obtains position information of the corresponding at least one driving element group from the at least one position sensor and adjusts a position of the at least one driving element group by using the position information.

5. The lens driving device as claimed in claim 1, wherein the control device in a first driving state supplies the power to the at least two coils of the at least one driving element group in an open loop way so that the at least one driving element group is moved from the pair of magnetic elements to the another pair of magnetic elements.

6. The lens driving device as claimed in claim 5, wherein the at least one driving element group further comprises two position sensors, each of which corresponds to one of the at least two coils, wherein the control device determines whether a specific one of the position sensors is not beyond the another pair of magnetic elements, and a loop for the coil corresponding to the specific one of the position sensors is turned into closed and a voltage is supplied to the coil corresponding to the specific one of the position sensors so as to move the at least one driving element group when the specific one of the position sensors is not beyond the another pair of magnetic elements.

7. The lens driving device as claimed in claim 6, wherein the control device in a closed loop way obtains position information of the corresponding at least one driving element group from the specific one of the position sensors and adjusts a position of the at least one driving element group by using the position information.

8. The lens driving device as claimed in claim 1, wherein the coils of the at least one driving element group are spaced a predetermined distance, and the predetermined distance is $(1 \times n) \pm 0.25$ times a width of the pair of magnetic elements, where n is a natural number.

9. The lens driving device as claimed in claim 1, wherein when magnetic field lines of the pair of magnetic elements have a phase angle of 360°, each of the coils and the magnetic group have a phase difference 360°±90° therebetween.

10. The lens driving device as claimed in claim 1, wherein the lens driving device satisfies a condition of:

$$1300 \text{ mm}^2 < \frac{LL}{Dmin} \times MW \times MH < 4291 \text{ mm}^2$$

where LL is a length in mm of a lens device measured from an object side surface of a lens closest to the object side to an image side surface of another lens closest to the image side, Dmin is a minimum of a range in mm of driving the coils, MW is a width in mm of each magnetic element, and MH is a height in mm of each magnetic element.

11. The lens driving device as claimed in claim 1, wherein the lens driving device satisfies a condition of:

$$0.04 < \frac{\sqrt{CD \times MD}}{LL} < 3.7$$

where CD is a distance in mm between the coils, MD is a distance in mm between centers of two adjacent magnetic elements, and LL is a length in mm of a lens device measured from an object side surface of a lens closest to the object side to an image side surface of another lens closest to the image side.

12. The lens driving device as claimed in claim 1, wherein the lens driving device satisfies a condition of:

$$-3.7 < (N \times MV - Dmax) + I < 40$$

where N is the amount of the magnetic elements, MV is a volume in mm³ of each magnetic element, Dmax is a maximum of a range in mm of driving the coils, and I is an electric current in A passing through the coils.

13. The lens driving device as claimed in claim 1, wherein the lens driving device satisfies a condition of:

$$15 \, A \cdot \Omega \cdot \sqrt{\text{mm}} < \frac{LL}{Dmin} \times I \times R \times \sqrt{\frac{CD \times MD}{LL}} < 3957 \, A \cdot \Omega \cdot \sqrt{\text{mm}}$$

where LL is a length in mm of a lens device measured from an object side surface of a lens closest to the object side to an image side surface of another lens closest to the image side, Dmin is a minimum of a range in mm of driving the coils, I is an electric current in A passing through the coils, R is an electric resistance in Ω of the coils, CD is a distance in mm between the coils, and MD is a distance in mm between centers of two adjacent magnetic elements.

14. The lens driving device as claimed in claim 1, wherein the lens driving device satisfies a condition of:

$$0.97 \frac{1}{\sqrt{\text{mm}}} \leq \frac{LL}{MV} \leq 2.76 \frac{1}{\sqrt{\text{mm}}}$$

where LL is a length in mm of a lens device measured from an object side surface of a lens closest to the object side to an image side surface of another lens closest to the image side, and MV is a volume in mm³ of each magnetic element.

15. The lens driving device as claimed in claim 1, wherein the lens driving device satisfies a condition of:

$$MH < LH$$

where MH is a height in mm of each magnetic element, and LH is a height in mm of a lens device.

16. A method of driving an optical element of a lens device to move, comprising:
   providing a lens driving device which comprises at least one lens frame, a magnetic group, at least one driving element group and a control device;
   supplying power to the at least one driving element group in sequence in an open loop way for controlling the at least one driving element group to move the at least one lens frame from a pair of magnetic elements to another pair of magnetic elements;
   determining whether the at least one driving element group corresponding to the another pair of magnetic elements is in a specific position; and
   when the at least one driving element group corresponding to the another pair of magnetic elements is not in the specific position, supplying the power to the at least one driving element group in a closed loop way for controlling the at least one driving element group corresponding to the another pair of magnetic elements to move from a first position to the specific position.

17. The method as claimed in claim 16, wherein the at least one driving element group further comprises at least one position sensor, the method further comprising:
   in the closed loop way, sensing a position of the at least one driving element group by the at least one position sensor to obtain position information;
   adjusting the position of the at least one driving element group by using the position information.

18. The method as claimed in claim 16, wherein the at least one driving element group further comprises two coils and two position sensors, and each of the position sensors corresponds to one of the coils, the method further comprising:
   determining whether a specific one of the position sensors is not beyond the another pair of magnetic elements;
   turning a loop for the coil corresponding to the specific one of the position sensors into closed when the specific one of the position sensors is not beyond the another pair of magnetic elements;
   driving the coil to move the at least one driving element group;
   in the closed loop way, sensing a position of the at least one driving element group by the position sensors to obtain position information;
   adjusting the position of the at least one driving element group by using the position information.

19. The method as claimed in claim 18, wherein the coils of the at least one driving element group are spaced a predetermined distance, and the predetermined distance is $(1 \times n) \pm 0.25$ times a width of the pair of magnetic elements, where n is a natural number;
   when magnetic field lines of the pair of magnetic elements have a phase angle of 360°, each of the coils and the magnetic group have a phase difference 360°±90° therebetween.

20. The method as claimed in claim 16, wherein the lens driving device satisfies at least one of following conditions:

$$1300 \text{ mm}^2 < \frac{LL}{Dmin} \times MW \times MH < 4291 \text{ mm}^2,$$

$$0.04 < \frac{\sqrt{CD \times MD}}{LL} < 3.7,$$

$$-3.7 < (N \times MV - Dmax) + I < 40,$$

$$15\, A \cdot \Omega \cdot \sqrt{\text{mm}} < \frac{LL}{Dmin} \times I \times R \times \sqrt{\frac{CD \times MD}{LL}} < 3957\, A \cdot \Omega \cdot \sqrt{\text{mm}},$$

$$0.97 \frac{1}{\sqrt{\text{mm}}} \leq \frac{LL}{MV} \leq 2.76 \frac{1}{\sqrt{\text{mm}}},$$

$$MH < LH,$$

where LL is a length in mm of the lens device measured from an object side surface of a lens closest to the object side to an image side surface of another lens closest to the image side, Dmin is a minimum of a range in mm of driving coils, MW is a width in mm of each magnetic element, MH is a height in mm of each magnetic element, CD is a distance in mm between the coils, MD is a distance in mm between centers of two adjacent magnetic elements, N is the amount of the magnetic elements, MV is a volume in mm³ of each magnetic element, Dmax is a maximum of a range in mm of driving the coils, I is an electric current in A passing through the coils, R is an electric resistance in Ω of the coils, and LH is a height in mm of the lens device.

* * * * *